US007273125B2

(12) United States Patent
Schuh

(10) Patent No.: US 7,273,125 B2
(45) Date of Patent: Sep. 25, 2007

(54) VARIABLE RESOLUTION CONTROL SYSTEM

(75) Inventor: Scott N. Schuh, Fort Ransom, ND (US)

(73) Assignee: Clark Equipment Company, Montvale, NJ (US)

( * ) Notice: Subject to any disclaimer, the term of this patent is extended or adjusted under 35 U.S.C. 154(b) by 344 days.

(21) Appl. No.: 10/955,846

(22) Filed: Sep. 30, 2004

(65) Prior Publication Data
US 2006/0065467 A1 Mar. 30, 2006

(51) Int. Cl.
B60K 17/00 (2006.01)
F16D 33/00 (2006.01)
G06F 19/00 (2006.01)
(52) U.S. Cl. ............... 180/305; 180/307; 180/308; 60/446; 701/50; 701/70
(58) Field of Classification Search ............ 180/305, 180/307, 308; 60/446; 701/50, 70
See application file for complete search history.

(56) References Cited
U.S. PATENT DOCUMENTS

| 4,076,094 | A | | 2/1978 | Moody et al. | 180/108 |
| 4,082,074 | A | | 4/1978 | Baugh | 123/140 |
| 4,620,575 | A | * | 11/1986 | Cuba et al. | 180/307 |
| 5,351,570 | A | * | 10/1994 | Mizunuma et al. | 74/335 |
| 5,553,453 | A | * | 9/1996 | Coutant et al. | 60/327 |
| 5,665,026 | A | | 9/1997 | Linden | 477/108 |
| 6,405,119 | B1 | | 6/2002 | Linden | 701/95 |
| 2002/0121399 | A1 | * | 9/2002 | Bohrer | 180/307 |
| 2003/0149513 | A1 | * | 8/2003 | Muragishi | 701/1 |
| 2003/0149518 | A1 | * | 8/2003 | Brandt et al. | 701/50 |

* cited by examiner

Primary Examiner—Christopher P. Ellis
Assistant Examiner—John R. Olszewski
(74) Attorney, Agent, or Firm—Michael Best & Friederich LLP

(57) ABSTRACT

The present disclosure is directed to a control system for a power machine that provides selected resolution of the adjusted speed control and other controls, such as attachment controls, to provide more options to the operator for fine positioning. The present disclosure includes a control system for a power machine. The power machine has a full speed. The control system has an adjustable propulsion controller that an operator can position along a range of movement. Examples of the adjustable propulsion controller include a joystick or an accelerator. The position of the propulsion controller along the range of movement selects the speed of the power machine between a first speed and a second speed, where the first speed is greater than the second speed. The first speed is selectable from a plurality of percentages of the full speed.

21 Claims, 5 Drawing Sheets

VARIABLE RESOLUTION CONTROL SYSTEM

BACKGROUND OF THE INVENTION

The present disclosure relates to control systems for power machines, such as skid steer loaders. More particularly, the present disclosure relates to a control system for a power machine that provides variable resolution of the adjustable controls for fine positioning.

Power machines include a number of work vehicles such as skid steer loaders. Skid steer loaders in general have a frame that supports a cab and a movable lift arm that supports a work tool such as a bucket, a forklift, or the like. The movable lift arm is coupled to the frame with power actuators such as hydraulic cylinders. In addition, the tool is coupled to the lift arm by one or more hydraulic cylinders. An operator manipulating the skid steer loader manipulates the tool by actuating the hydraulic cylinders. Skid steer loaders also commonly have an engine that drives a hydraulic pump to power hydraulic traction motors. The traction motors are commonly coupled to wheels through a drive mechanism to move or drive the skid steer loader.

Power machines also include an actuator for directing the speed of the vehicle, i.e., an adjustable speed controller. One example of an adjustable speed controller is a joystick on the skid steer loader that can be used to direct both the speed and course of travel. The user can manipulate the adjustable speed controller over a range of motion to direct the skid steer loader to operate over a range of speed.

Some loaders are provided with a user input for causing the loader to be operated in a selected one of two ranges of speeds. For example, if loader has been rented to a novice user, the rental dealer may wish to set the speed to a lower speed. Similarly, where a loader is attached to a sensitive tool, such as a forklift, and the user is approaching a pallet, the user may wish to switch the operation of the loader into a slower, less responsive mode that allows for finer positioning. By contrast, when a user is simply driving down a road, the user may wish to control loader in a higher speed mode. Therefore, some loaders have been provided with a selector that can be manipulated to select between a low-speed and a high-speed mode.

SUMMARY OF THE INVENTION

The present disclosure is directed to a control system for a power machine that provides for selected resolution of the adjustable speed control and more options to the operator for fine positioning. The present disclosure includes a control system for a power machine. The power machine has a full speed. The control system has an adjustable propulsion controller that an operator can position along a range of movement. Examples of the adjustable propulsion controller include a joystick or an accelerator. The position of the propulsion controller along the range of movement selects the speed of the power machine between a first speed and a second speed, where the first speed is greater than the second speed. The first speed is selectable from a plurality of percentages of the full speed.

In one aspect, the control system includes two modes. In a first mode, the first speed is full speed. For example, the joystick fully urged in one direction will direct the loader to travel at full speed. In the second mode, the joystick can only direct the loader to travel at a speed that is a percentage of the full speed. In the second mode, this percentage of full speed is variable to provide several options for finer positioning.

It is to be understood that although much of the present disclosure is directed to variable speed resolution, the present invention can be applied to other functions or controls of the power machine. For instance, controls for the lifting and tilting of the lift arm controls are covered in this disclosure also. In this aspect, the control systems for the lift arm, cylinders, or both include two modes. In a first mode, the first responsiveness of the control is full responsiveness. For example, the joystick or other actuator fully urged in one direction will direct the cylinder or lift arm to travel at full speed, or responsiveness. In the second mode, the joystick or actuator can only direct the loader to move at responsiveness that is a percentage of the full responsiveness. In the second mode, this percentage of full responsiveness is variable to provide several options for finer positioning.

DETAILED DESCRIPTION OF THE PREFERRED EMBODIMENTS

This disclosure relates to power machines such as skid steer loaders and control systems for the power machines. The disclosure, including the figures, describes the power machines and control systems with reference to several illustrative examples. For instance, the disclosure proceeds with respect to a skid steer loader described below. However, it should be noted that the present invention could be implemented in other power machines, such as mini-excavators, as well. The present invention is described with respect to the loader for illustrative purposes only. Other examples are contemplated and are mentioned below or are otherwise imaginable to someone skilled in the art. The scope of the invention is not limited to the few examples, i.e., the described embodiments of the invention. Rather, the scope of the invention is defined by reference to the appended claims. Changes can be made to the examples, including alternative designs not disclosed, and still be within the scope of the claims.

This disclosure uses the word "between" in describing several ranges. The limits of the described range are intended to be included in the range. For example, in the phrase "between a first speed and a second speed," the range includes the first speed and the second speed. Similarly, in the phrase "between fifty and one hundred percent of full speed," the range includes fifty and one hundred percent of full speed. Other examples may be present.

In addition, speed is a type of responsiveness. Other types of responsiveness in addition to speed are contemplated.

Figure 1:
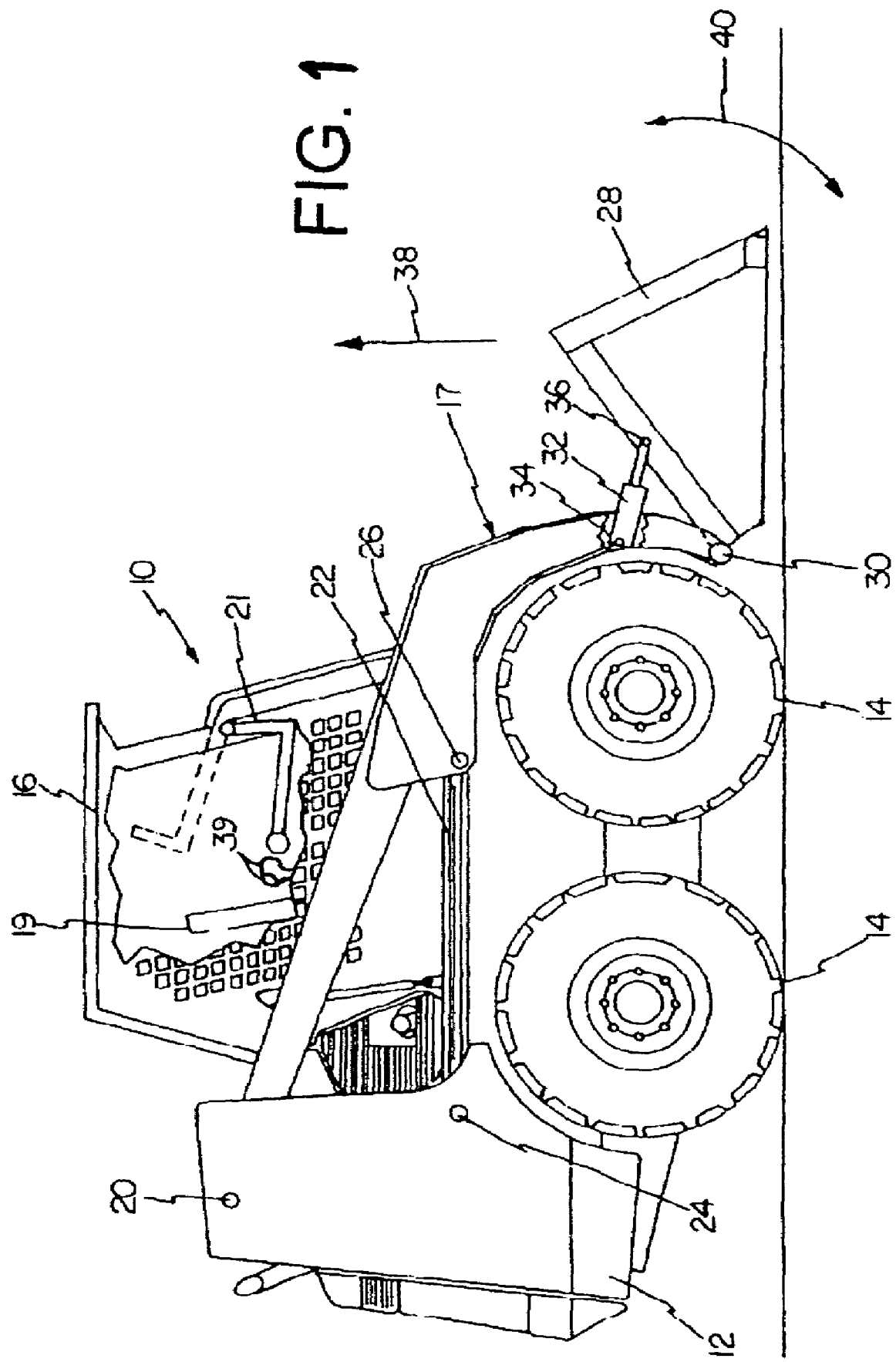
FIG. 1 is an elevation view of a skid steer loader constructed in accordance with one embodiment of the present disclosure.

FIG. 1 is a side elevation view of a skid steer loader 10. Skid steer loader 10 includes a frame 12 supported by wheels 14. Frame 12 also supports a cab 16 that defines an operator compartment and that substantially encloses a seat 19 on which an operator sits to control skid steer loader 10. Cab 16 can take any shape desired and is illustrated with the shape shown for illustrative purposes only. A seat bar 21 is pivotally coupled to a portion of cab 16. When the operator occupies seat 19, the operator then pivots seat bar 21 from the raised position (shown in phantom in FIG. 1) to the lowered position shown in FIG. 1. It should also be noted that seat bar 21 can be a rear pivot seat bar or can take substantially any other form and need not be a bar.

A lift arm 17 is coupled to frame 12 at pivot points 20 (only one of which is shown in FIG. 1, the other being identically disposed on the opposite side of loader 10). A pair of hydraulic cylinders 22 (only one of which is shown in FIG. 1) is pivotally coupled to frame 12 at pivot points 24 and to lift arm 17 at pivot points 26. Lift arm 17 is also coupled to a working tool that, in this preferred embodiment, is a bucket 28. Lift arm 17 is pivotally coupled to bucket 28 at pivot points 30. In addition, another hydraulic cylinder 32 is pivotally coupled to lift arm 17 at pivot point 34 and to bucket 28 at pivot point 36. While only one cylinder 32 is shown, it is to be understood that any desired number of cylinders could be used to work bucket 28 or any other suitable tool. Similarly, other mechanical linkages can be used as well.

The operator residing in cab 16 can manipulate lift arm 17 and bucket 28 by selectively actuating hydraulic cylinders 22 and 32. By actuating hydraulic cylinders 22 and causing hydraulic cylinders 22 to increase in length, the operator moves lift arm 17, and consequently bucket 28, generally vertically upward in the direction indicated by arrow 38. Conversely, when the operator actuates cylinder 22 causing it to decrease in length, bucket 28 moves generally vertically downward to the position shown in FIG. 1.

The operator can also manipulate bucket 28 by actuating cylinder 32. When the operator causes cylinder 32 to increase in length, bucket 28 tilts forward about pivot points 30. Conversely, when the operator causes cylinder 32 to decrease in length, bucket 28 tilts rearward about pivot points 30. The tilting is generally along an arcuate path indicated by arrow 40.

FIG. 1 also illustrates a plurality of hand controls, or hand grips 39 that reside within the operator compartment 16. Hand grips 39 illustratively are provided with a number of actuators (such as push buttons, potentiometers, switches, etc.) that can be manipulated by the operator to accomplish certain functions. The operator-actuable inputs on hand grips 39 in one illustrative embodiment provide electrical signals to a control computer (described in greater detail later in the specification) that controls certain functions of loader 10 in response to the signals received.

In addition, in one illustrative embodiment, one or more operator input and display panels (shown in FIG. 2) are provided in operator compartment 16. The operator input display panels provide a display for indicating certain items of information to the operator, and can also provide additional operator input devices, such as a membrane keypad, a touch sensitive screen, etc., through which the operator can provide inputs.

It should, however, be noted that inputs can be provided in a mechanical way as well. For instance, hand grips 38 can be coupled to levers which control valve spools or solenoids through mechanical linkages. Similarly, foot pedals can be provided in operator compartment 16 that also control valve spools or solenoids through mechanical linkages.

In addition, loader 10 illustratively has one or more auxiliary hydraulic couplings (not shown in FIG. 1) that can be provided with quick disconnect type fittings. Hydraulic pressure to the auxiliary couplings can also be controlled based on signals from one or more of the operator input devices within operator compartment 16.

Figure 2:
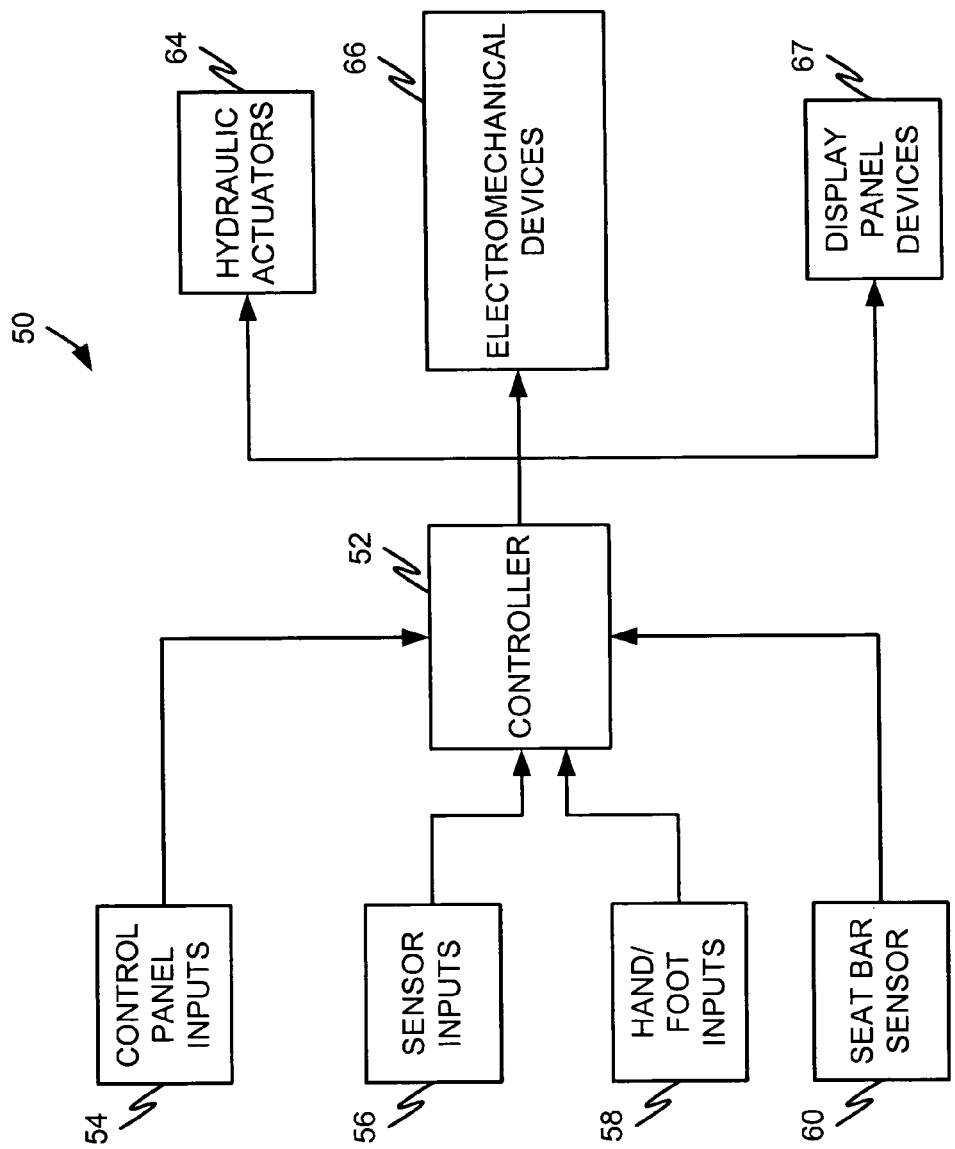
FIG. 2 is a block diagram of an exemplary control system of the skid steer loader of FIG. 1.

FIG. 2 is a block diagram of one embodiment of a control system 50. System 50 includes controller 52, control panel inputs 54, sensor inputs 56, hand/foot inputs 58, sensor 60, hydraulic actuators 64, electromechanical solenoids 66, and display panel devices 67. Controller 52 is illustratively a digital computer, microprocessor, or microcontroller with associated memory that can be integrated or provided separately. Controller 52 also includes appropriate timing circuitry.

Control panel inputs 54 can include a wide variety of operator interfaces used to control such features as headlights, interlock systems, ignition, etc. This information can be transmitted to controller 52 via direct or wireless digital inputs, a one-way serial stream or any number of bi-directional serial communication protocols. Similarly, the connection between control panel inputs 54 and controller 52 illustratively includes power and ground connections as well.

Sensor inputs 56 can also include a wide variety of analog or digital sensors or frequency inputs indicative of operating conditions or other sensed items, such as engine oil pressure sensor, fuel sensor, engine cooling sensor, air filter sensor (which indicates reduced air flow—thus indicating a clogged air filter), engine speed sensor, a hydraulic oil temperature sensor, a hydraulic oil charge pressure sensor, and/or a hydraulic oil filter pressure switch, etc.

Hand grip and foot pedal inputs 58 can also include a variety of input devices that form the operator actuable inputs within operator compartment 16. Such inputs can provide signals indicative of requested operation of the auxiliary hydraulic couplers (e.g., modulated control), requested detent, requested high speed or low speed operation in a multi-speed loader, and other requested functions (such as lift and tilt of the tool mounted to the loader, etc.).

Seat bar sensor 60 is illustratively coupled to seat bar 21. Seat bar sensor 60 illustratively provides a signal indicative of whether seat bar 21 is in the raised or lowered position illustrated in FIG. 1.

Hydraulic actuators 64 illustratively include the lift and tilt cylinders for use in manipulating tool 28 (shown in FIG. 1), a high flow valve for emitting high flow hydraulic fluid in response to a user input, a diverter valve for diverting hydraulic fluid to the auxiliary couplers in response to a user input, auxiliary relief valves, and a plurality of lockout valves for being actuated in response to operator inputs, or in response to certain sensed operating parameters. Of course, the hydraulic actuators are controlled by manipulating valve spools of valves connected between the specific actuator being controlled and a source of, or reservoir for, hydraulic fluid. Such valves include one or more primary valves controlling flow to primary hydraulic couplers and optionally one or more auxiliary valves for controlling flow to auxiliary hydraulic couplers. The valves can be controlled electronically, hydraulically or mechanically. Block 64 represents all of these elements.

Electromechanical solenoids 66 also include a wide variety of items. Some items are embodied as electrical relays that are controlled by energizing an electrical relay coil. Such electromechanical devices illustratively include a starter relay for energizing a starter, a switched power relay for providing battery power for switched power devices, a fuel shut-off relay for energizing a fuel shut-off valve, a traction lock relay for energizing a traction lock solenoid, a glow plug relay for energizing glow plugs, and light relays for controlling various lights (such as headlights, marker lights, etc.).

Display panel devices 67 are illustratively devices that receive outputs from controller 52 and indicate information to the operator. Such devices can include, for example, indicator lights, an hour meter, gauges, etc. Display panel devices 67 can be integrated with control panel inputs 54 as a unitary input and display panel, or provided separately.

In operation, controller 52 receives a variety of inputs from the control panel inputs 54, the sensor inputs 56, the hand and foot actuable inputs 58, and seat bar sensor 60. In response to those inputs, controller 54 provides outputs to hydraulic actuators 64 electromechanical devices 66 and display panel devices 67 to control various functions on loader 10.

Figure 3:
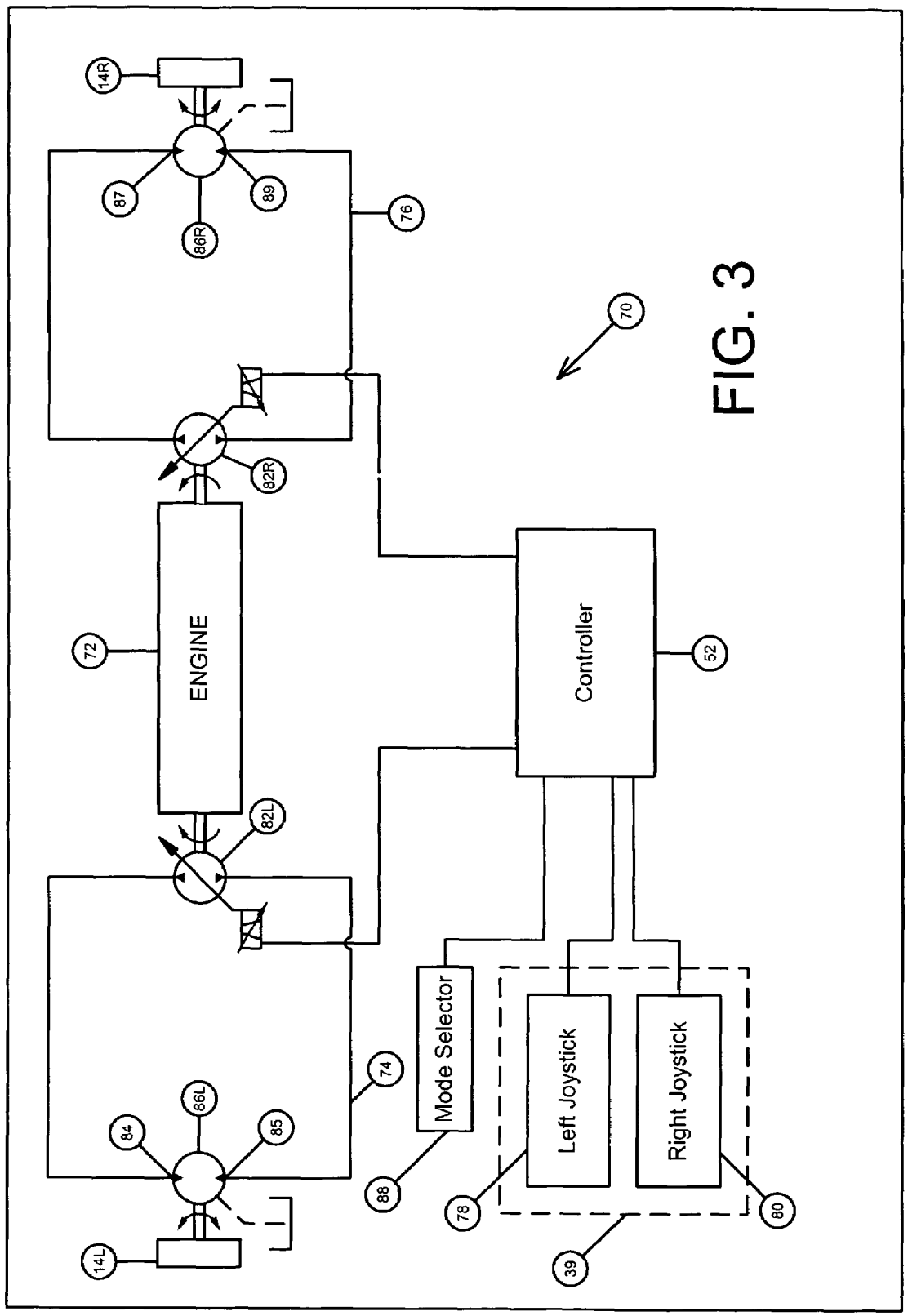
FIG. 3 is block diagram of the control system as applied to an exemplary drive system of the skid steer loader of FIG. 1.

FIG. 3 is one example of the control system 50 as applied to a drive circuit 70 for controlling wheel direction and speed. The loader 10 in the example includes an engine 72 couple to a pair of hydraulic, or hydrostatic, drive systems 74, 76 that are used to control the left and right set of wheels 14L and 14R. Hand grips 39, above, in the example are in the form of left and right joysticks 78, 80 that provide driver inputs to the controller 52. The controller 52 provides a signal to the drive systems 74, 76 that is used to control the speed and direction of the wheels 14L and 14R on the left and right sides of the loader 10.

In the example, the engine 72 and controller 52 are coupled to a pair of variable displacement hydrostatic pumps 82L and 82R. Pump 82L is coupled to a pair of system ports 84 and 85 of a hydraulic, or hydrostatic, motor 86L. Pump 82R is also coupled to a pair of system ports 87 and 89 of a hydrostatic, or hydraulic, motor 86R. The motors 86L, 86R are coupled to the wheels 14L, 14R, respectively.

Each drive system 74, 76 is a closed loop system. In one example, system port 84 is an inlet port and port 85 is an outlet port for forward direction, and port 85 is and inlet port and port 84 is an outlet port for reverse direction. Closed loop system 76 includes ports 87 and 89 that operate in a similar manner.

In one particular example, pumps 82L, 82R are electrical displacement control pumps such as Series 42 EDC available from Sauer-Danfoss of Ames, Iowa. Motors 86L, 86R are conventional fixed displacement radial piston motors available from the Rexroth Hydraulics unit of Mannesman Rexroth, of Germany. In this arrangement, the amount of fluid provided from pumps 82L, 82R determines the speed of motor rotation which is associated with the speed of the wheels 14L, 14R.

The example is shown with a pair of joysticks 78, 80, although a single joystick or other propulsion or speed control can be used. One joystick is used to control one drive system, and the other joystick is used to control the other drive system. The joysticks 78, 80 each drive a voltage signal from a potentiometer or other variable voltage source that will indicate whether the direction of the associated motor should be forward or reverse.

In addition, the variable voltage signal can direct the speed of the motor. For example, a joystick at its rested position can provide a signal of about 2.5 volts direct current (DC), which is translated by the controller as a stopped position of the motor. The joystick can be fully urged in a first direction to provide a signal of about 4.5 volts DC to indicate a maximum forward speed of approximately 7 miles per hour. The joystick fully urged in a second direction, i.e., opposite the first direction, provides a signal of about 0.5 volts DC to indicate a maximum reverse speed.

The control system of the example also includes a mode selector 88 that can toggle the drive system 70 between a first mode and a second mode. In the first mode, the joystick fully urged in the first direction drives the wheels forward at a full speed. In the second mode, the joystick fully urged in the first direction will drive the wheels at a speed that is a percentage of the full speed. The percentage of the full speed can also be selected. This operation is described below.

Figure 4:
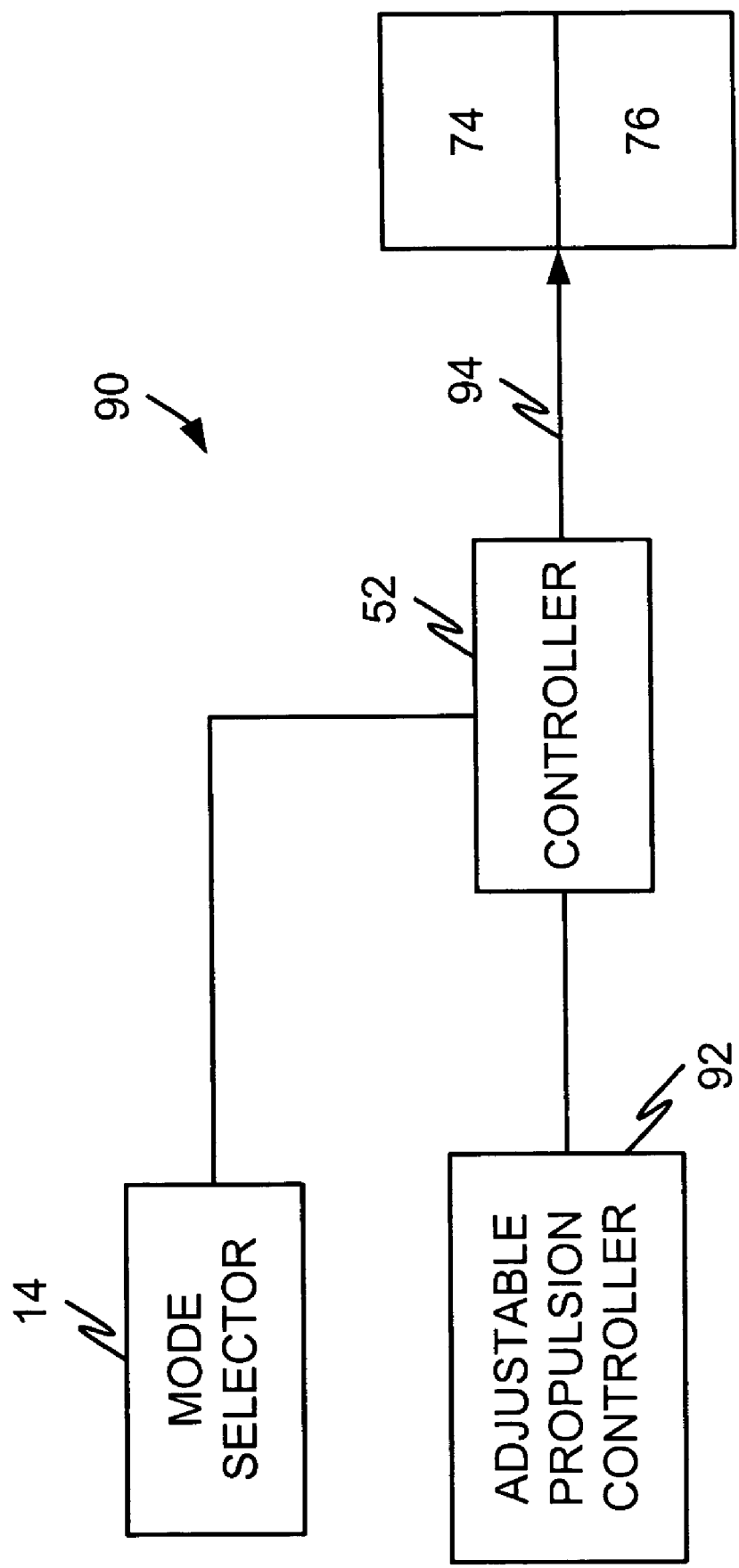
FIG. 4 is a block diagram of an illustrative control system of the present disclosure.

FIG. 4 shows a block diagram of an illustrative control system 90 including controller 52 receiving inputs from an adjustable propulsion controller 92 and mode selector 88. The controller provides at least one output 94 to the drive systems 74, 76 to drive the power machine.

The adjustable propulsion controller 92 directs the speed of the wheels 14 based on its physical positioning. In the example above, the adjustable propulsion controller is a joystick. In another example, it is an acceleration pedal, a knob, button, lever, switch, or the like. Other examples are contemplated. The operator, for example, can physically position the adjustable propulsion controller along an available range of motion. The range of motion can be between a first position and a second position. For example, in a joystick, the first position is a fully urged position and the second speed can be at a resting position. The operator can move the joystick anywhere between the resting position and the fully urged position to direct the speed of the wheels.

When the mode selector 88 is set in the first mode, the operator can use the adjustable position controller to select a speed up to a full speed. Full speed can be obtained when the adjustable propulsion controller is in a fully urged position, such as the first position. Full speed is, for example, the fastest forward direction speed the wheels or power machine will travel as directed by the adjustable propulsion controller 92 under the circumstances. Such circumstances can include maintenance of the vehicle, weight of the payload, ground conditions, slope of the terrain, and the like. In another example, full speed is the fastest forward direction speed the vehicle will travel in the first position.

The second speed is less than the first speed. In one example, the second speed is zero or stopped. In this example, the adjustable position controller 92 can be moved along a range of motion that selects the speed to be between stopped and full speed.

In some examples, the adjustable propulsion controller 92 is used to control the direction of the power machine. In the case of the joystick, the joystick can be urged in an opposite direction than toward the first position to select the speed of the power machine in reverse. In one example of this case, the position of the adjustable propulsion controller 92 can be considered to include a second range of motion, in addition to the available first range of motion above. The first range of motion directs the speed between stopped and full speed forward, and the second range of motion directs the speed between stopped and full speed reverse. The description of the control system 90 can be applied to the second, or additional ranges of motion.

In another example of the case of the adjustable propulsion controller 92 used to control speed and direction, the range of motion can be considered to include the entire range of motion, such as from full speed forward to full speed reverse. In this case, full speed reverse is considered to be less than full speed forward because speeds in the reverse direction are negative speeds as used here.

When the mode selector 88 is set to the second mode, the speed is not necessarily full speed when adjustable propulsion controller 92 is in the first position. Rather, the speed is "top speed," which is a percentage (less than or equal to 100%), or, in some examples, more than 100%) of the full speed. The operator can select the top speed, or the percentage of full speed, from two or more percentages of the full speed. In one example, the second mode provides top speeds from anywhere between fifty to one hundred percent of full speed, i.e. "infinitely adjustable" between fifty and one hundred percent. In another example, top speeds are available at one percent increments of full speed, e.g., 100%, 99%, 98%, and so on. Other examples or percent ranges are available or contemplated. Thus, if the full speed of a vehicle is 7.0 miles per hour when the adjustable propulsion controller is fully urged to the first position, the top speed that is set at 50% of full speed is only 3.5 miles per hour when the adjustable propulsion controller is fully urged to the first position.

The use of the second mode permits for slower, less responsive controls that allow finer positioning. In other words, the slower controls provide for greater resolution in the adjustable propulsion controller, which still can use the same range of motion. The resolution is variable because the operator, or other, can select from one of a number of top speeds. In one example, the operator can set the percentage of top speed based on the intended use of the power machine. Driving down the road may be performed in the first mode, scooping up landscaping rock may be performed in the second mode with a tops speed set at 75% of full speed, working on hilly terrain may be performed in the second mode with a top speed set at 67% of full speed, or moving pallets can be performed in the second mode with a top speed set at 50% of full speed, and so on. In another example, the uses may apply the second mode to effect a type of "cruse control." For instance, the users may wish to travel at a selected speed that is a percentage of full speed. The second mode is set to the selected speed and the user travels with the adjustable propulsion controller in the first position.

Other functions, such as lift arm control, set in the second mode permits for slower and less responsive controls that also allow finer positioning. The less responsive controls provide for greater resolution in the lift arm actuator, which still can use the same range of motion. The resolution is variable because the operator, or other, can select from one of a number of top responsiveness.

A rental dealer can set and lock the percentage of the full responsiveness based on the renter's project and ability, or other criteria. A novice user might only be comfortable with 50% responsiveness of full responsiveness with respect to propulsion, lift arm, tilt cylinder, tool, and auxiliary control. With the variable resolution, users can select the correct resolution that suits them, and adjust the resolution whenever necessary. The control system provides the user with what can appear to be a custom built loader.

Figure 5:
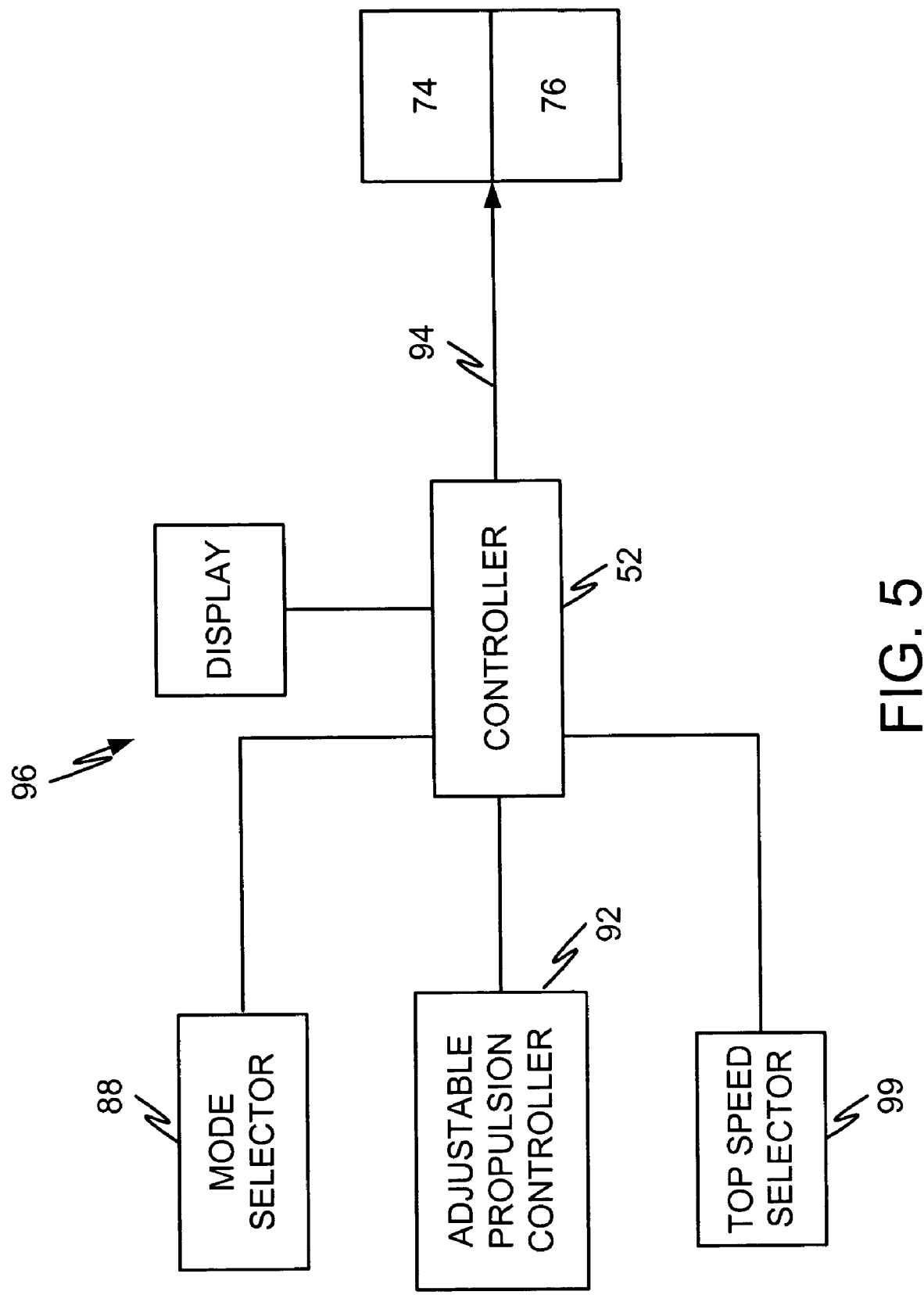
FIG. 5 is a block diagram of another illustrative control system of the present disclosure.

FIG. 5 is a block diagram of another example of the control system 96 where like components include like reference numerals. The control system 96 includes controller 52 receiving inputs from adjustable propulsion controller 92 and mode selector 88 and providing an output to the drive systems 74, 76. System 96 also includes display 98 and top speed selector 99 coupled to the controller 52.

The display 98 indicates the selected percentage of full speed that corresponds to the top speed when the mode selector 88 is set to mode two. In one example, the display 98 doubles as the hour-counter display. When the mode selector 88 sets control system 96 in the first mode, the display 98 indicates the hours of operation of the power machine 10. When the mode selector 88 sets control system 96 in the second mode, the display 98 indicates the selected percentage of full speed. In one example, the display 98 is a liquid crystal display indicator. In this example, the display is a multi-function display because it serves multiple purposes.

The top speed selector 99 is a device where the user provides an input to vary the percentage of full speed when selecting top speed. The selector 99 can be a dial, up and down buttons, a keypad, or the like. In one example, the top speed selector 99 and the mode selector 88 components can be incorporated into the same device.

In the systems 90 and 96 of FIGS. 4 and 5, the controller 52 provides an output to the drive systems 74, 76. This output can include several aspects. Among these aspects is a signal to control the hydrostatic pumps 82L, 82R to provide the selected speed. Another aspect can be to indicate to the pumps 82L, 82R that the second mode is selected.

In one example, the selection of the second mode performs a modification to the pumps 82L, 82R to effect the change in resolution of the controls 92. For example, the pumps 82L, 82R can include a variable swash plate that can be adjusted based on the selected top speed. The swash plate can be adjusted to create a shorter stroke when the top speed is less than the full speed. This will provide for finer positioning of the controls 92 over the full range of motion of the adjustable propulsion controller. Of course, other examples of varying the resolution through mechanical adjustments of the drive systems 74, 76 are contemplated as well.

In one example, the first mode is the default mode, and is activated on power-up. The second mode is activated with a button on a joystick. The percentage of full speed is activated with a three position momentary rocker switch having increase, neutral, and decrease positions. The increase position increases the percentage of full speed in the second mode, and the decrease position decreases the percentage of full speed in the second mode. The longer the rocker switch is held in a position, the faster the percentage will increment. This example provides for both good resolution and quick speed changes.

The present invention has now been described with reference to several embodiments. The foregoing detailed description and examples have been given for clarity of understanding only. Those skilled in the art will recognize that many changes can be made in the described embodiments without departing from the scope and spirit of the invention. Thus, the scope of the present invention should not be limited to the exact details and structures described herein, but rather by the appended claims and equivalents. For instance, the present invention is discussed with respect to a skid steer loader but could just as easily be implemented on another power machine such as a mini-excavator, an all-wheel steer vehicle, a track drive vehicle, or other power machine.

Although the present invention has been described with reference to preferred embodiments, workers skilled in the art will recognize that changes may be made in form and detail without departing from the spirit and scope of the invention.

What is claimed is:

1. A control system for a power machine, the control system comprising:
   an adjustable controller for a function of the power machine, the adjustable controller positionable along a range of movement, wherein position of the adjustable controller along the range of movement selects a responsiveness of the power machine between a first responsiveness and a second responsiveness, wherein the second responsiveness is less than the first responsiveness;
   and a mode selector selectable to one of a first mode and a second mode, wherein the first responsiveness of the first mode is a full responsiveness, and the first responsiveness of the second mode is a top responsiveness, wherein the top responsiveness is a percentage of the full responsiveness;

wherein the top responsiveness is adjustable and selected from a plurality of percentages of the full responsiveness; and wherein the adjustable controller selects the responsiveness at greater resolution when in the second mode.

2. The control system of claim 1, wherein the adjustable controller is a propulsion controller and wherein the second responsiveness in the first and second modes is machine stop.

3. The control system of claim 2, wherein the adjustable propulsion controller is further positionable along another range of motion wherein the position of the propulsion controller along the another range of motion selects the responsiveness of the power machine in a reverse direction.

4. The control system of claim 3, wherein the propulsion controller selects the responsiveness of the power machine in a reverse direction between a first reverse responsiveness and a second reverse responsiveness;

wherein the first reverse responsiveness in the first mode is a full responsiveness reverse and the first reverse responsiveness in the second mode is a top responsiveness reverse; and wherein the top responsiveness reverse is adjustable and selected from a plurality of percentages of the full responsiveness.

5. The control system of claim 2, wherein the second responsiveness in the first mode is full responsiveness reverse.

6. The control system of claim 1, wherein the adjustable controller is a joystick.

7. The control system of claim 1, wherein the top responsiveness is infinitely adjustable over a range of percentages.

8. The control system of claim 1, wherein the power machine is a loader movable over the ground, and wherein the function is the speed of movement of the loader over the ground.

9. A power machine having an engine, the power machine comprising:

a hydraulic drive system including a hydraulic pump coupled to the engine, and a hydraulic motor couple to the pump; and a control system, the control system comprising:

an electronic controller coupled to the hydraulic pump;

an adjustable propulsion controller positionable along a range of movement, the adjustable propulsion controller providing an input to the electronic controller, wherein position of the propulsion controller along the range of movement selects the responsiveness of the power machine between a first responsiveness and a second responsiveness, wherein the first responsiveness is greater than the second responsiveness;

a mode selector selectable to one of a first mode and a second mode, the mode selector providing an input to the electronic controller wherein the first responsiveness of the first mode is a full responsiveness, and the first responsiveness of the second mode is a top responsiveness, wherein the top responsiveness is a percentage of the full responsiveness; and wherein the top responsiveness is adjustable and selected from a plurality of percentages of the full responsiveness; and wherein the electronic controller provides a signal to adjust the hydraulic pump to provide for greater resolution of the adjustable propulsion controller at lesser percentages of full responsiveness when the mode selector is in the second mode.

10. The power machine of claim 9, wherein the power machine includes two hydraulic drive systems and the adjustable propulsion controller directs one of the two hydraulic drive systems.

11. The power machine of claim 9, wherein the hydraulic drive systems are closed loop systems.

12. The power machine of claim 9, wherein the hydraulic pump is variable and electronic controller directs the pump to generate a shorter stroke when a lesser percentage of the full responsiveness is selected.

13. The power machine of claim 9, wherein the control system further includes a display to indicate the percentage of top responsiveness.

14. The power machine of claim 13, wherein the display is a multi-function display.

15. The power machine of claim 9, wherein the power machine is a loader movable over the ground, and wherein the function is the speed of movement of the loader over the ground.

16. A control system for a power machine, the control system comprising:

a first adjustable controller for a first function of the power machine, the first adjustable controller movable along a range of movement to select a responsiveness between a first responsiveness and a second responsiveness, the second responsiveness being less than the first responsiveness;

a second adjustable controller for a second function of the power machine, the second adjustable controller movable along a range of movement to select a responsiveness between a third responsiveness and a fourth responsiveness, the fourth responsiveness being less than the third responsiveness; and a mode selector selectable to one of a first mode and a second mode, the first responsiveness in the first mode being a first function full responsiveness, the third responsiveness in the first mode being a second function full responsiveness, the first responsiveness in the second mode being a first function top responsiveness, the first function top responsiveness being a percentage of the first function full responsiveness, and the third responsiveness in the second mode being a second function top responsiveness, the second function top responsiveness being a percentage of the second function full responsiveness.

17. The control system of claim 16, wherein the power machine includes a lift arm, and wherein the first function is control of the lift arm.

18. The control system of claim 17, wherein the first function is a speed of the power machine.

19. The control system of claim 16, wherein the top responsiveness is selectable from incremental percentages of the full responsiveness.

20. The control system of claim 16, wherein the top responsiveness is an infinitely adjustable percentage of the full responsiveness.

21. The control system of claim 16, wherein the power machine is a loader movable over the ground, the loader including a lift arm, wherein the first function is the speed of movement of the loader over the ground, and wherein the second function is control of the lift arm.

* * * * *